S. VESSOT, E. NADEAU & A. PAQUIN.
CANDY FORMING AND CUTTING MACHINE.
APPLICATION FILED FEB. 4, 1910.

986,878.

Patented Mar. 14, 1911.
3 SHEETS—SHEET 1.

Witnesses.
C. J. Cote
C. F. Gerrard

Inventors.
Samuel Vessot
Edward Nadeau
& Alphonse Paquin
by Lloyd Blackmore Atty S. VESSOT, E. NADEAU & A. PAQUIN.
CANDY FORMING AND CUTTING MACHINE.
APPLICATION FILED FEB. 4, 1910.

986,878.

Patented Mar. 14, 1911.

3 SHEETS—SHEET 2.

Witnesses.

Inventors.

S. VESSOT, E. NADEAU & A. PAQUIN.
CANDY FORMING AND CUTTING MACHINE.
APPLICATION FILED FEB. 4, 1910.
986,878.
Patented Mar. 14, 1911.
3 SHEETS—SHEET 3.
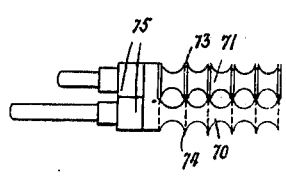
Fig. 8.
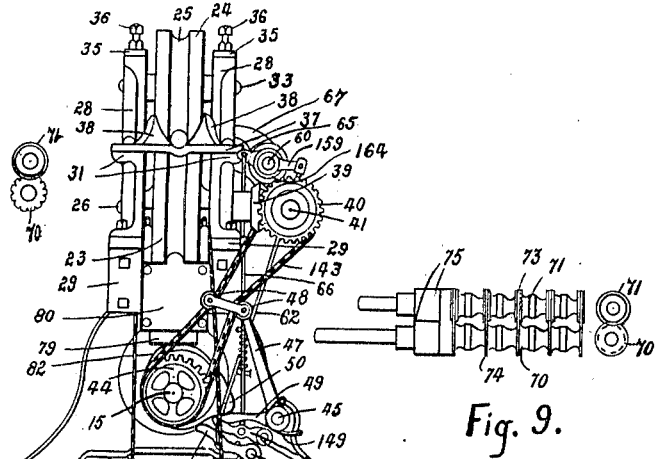
Fig. 4.
Fig. 9.
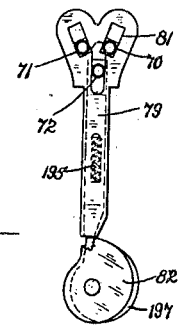
Fig. 10.
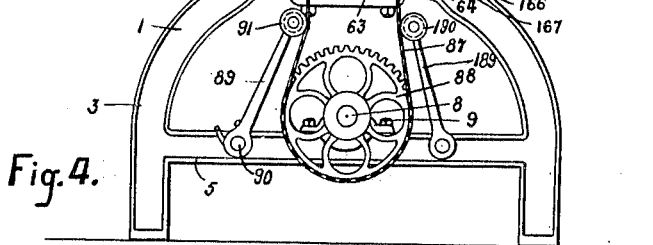
Fig. 7.
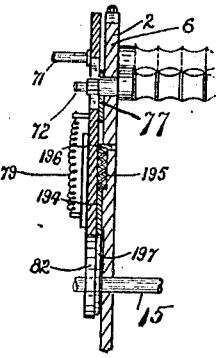
Fig. 11.
Witnesses.
C. J. Cote.
C. F. Servan.
Inventors.
Samuel Vessot
Edouard Nadeau
& Alphonse Paquin
by Lloyd Blackmore atty.

UNITED STATES PATENT OFFICE.

SAMUEL VESSOT, EDOUARD NADEAU, AND ALPHONSE PAQUIN, OF JOLIETTE, QUEBEC, CANADA; SAID PAQUIN ASSIGNOR TO SAID VESSOT.

CANDY FORMING AND CUTTING MACHINE.

986,878.                 Specification of Letters Patent.     Patented Mar. 14, 1911.

Application filed February 4, 1910. Serial No. 542,008.

*To all whom it may concern:*

Be it known that we, SAMUEL VESSOT, EDOUARD NADEAU, and ALPHONSE PAQUIN, subjects of the King of Great Britain, residing in the town of Joliette, in the Province of Quebec, in the Dominion of Canada, have invented certain new and useful Improvements in Candy Forming and Cutting Machines, of which the following is a specification.

The invention relates to improvements in candy forming and cutting machines, as described in the present specification and illustrated in the accompanying drawings that form part of the same.

The invention consists essentially of the novel arrangement and construction of parts, whereby a continuously-operated main shaft imparts the desired movement to the various elements, which pass the candy or the like in its plastic form between intermittently-operated channel rolls onto a trough in stick form, where it is cut and the trough opened to deposit the stick of candy between a plurality of forming and cutting spindles, which gradually close together and form and divide the length of candy into a multitude of small pieces of any desired shape and finally open and eject the same onto a vibratory drying-screen.

The objects of the invention are to devise a machine of durable construction, which may be readily operated by one person, and have the main shaft thereof rotated without interruption to quickly form up and divide the candy into a multitude of similarly-shaped pieces under one operation, whereby much time is saved and the output of the machine increased, the several parts thereof being of simple construction, whereby the forming and cutting spindles may be readily changed to form and cut candy into any desired circular shape and size.

Figure 1:
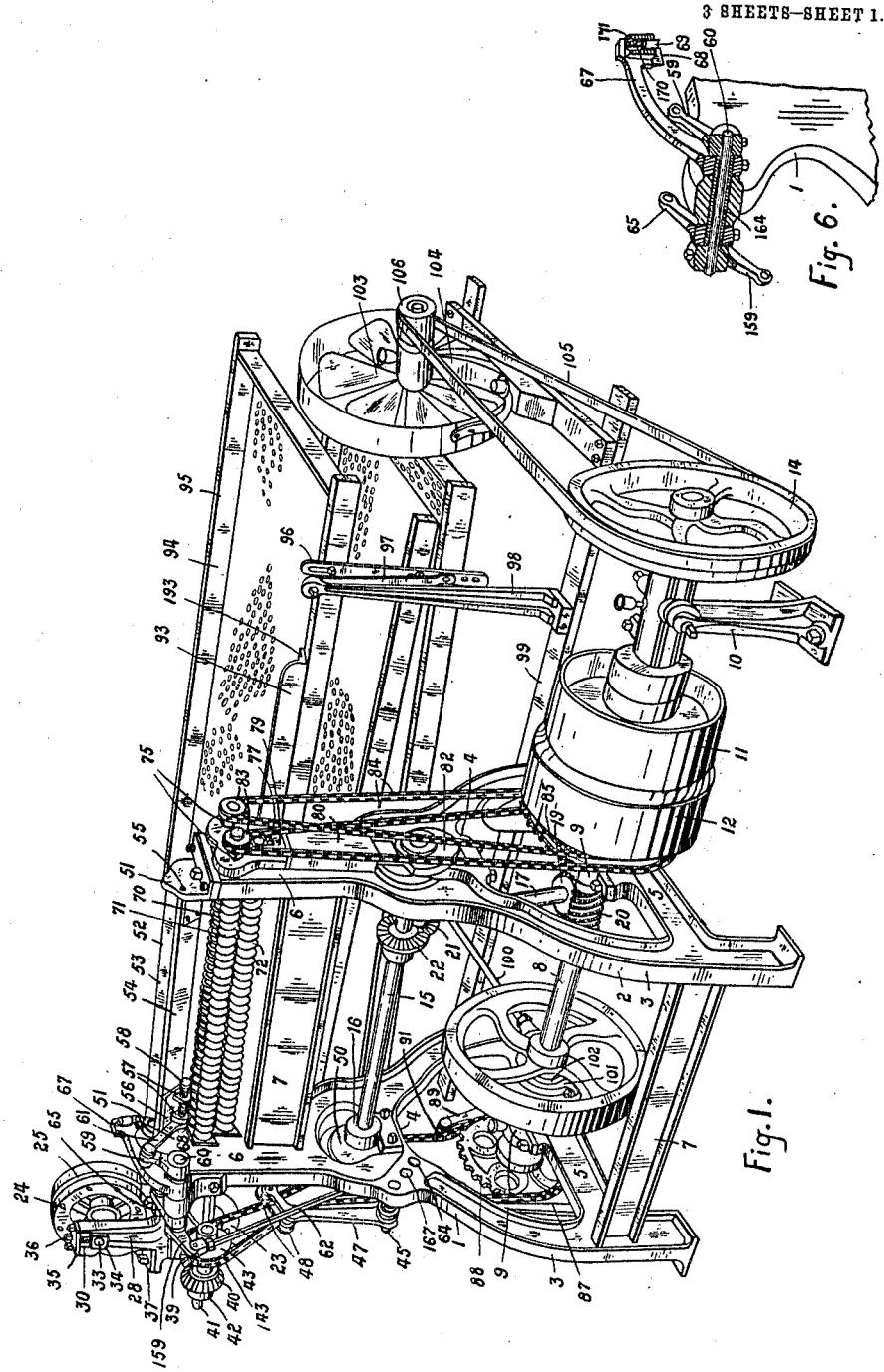
Figure 2:
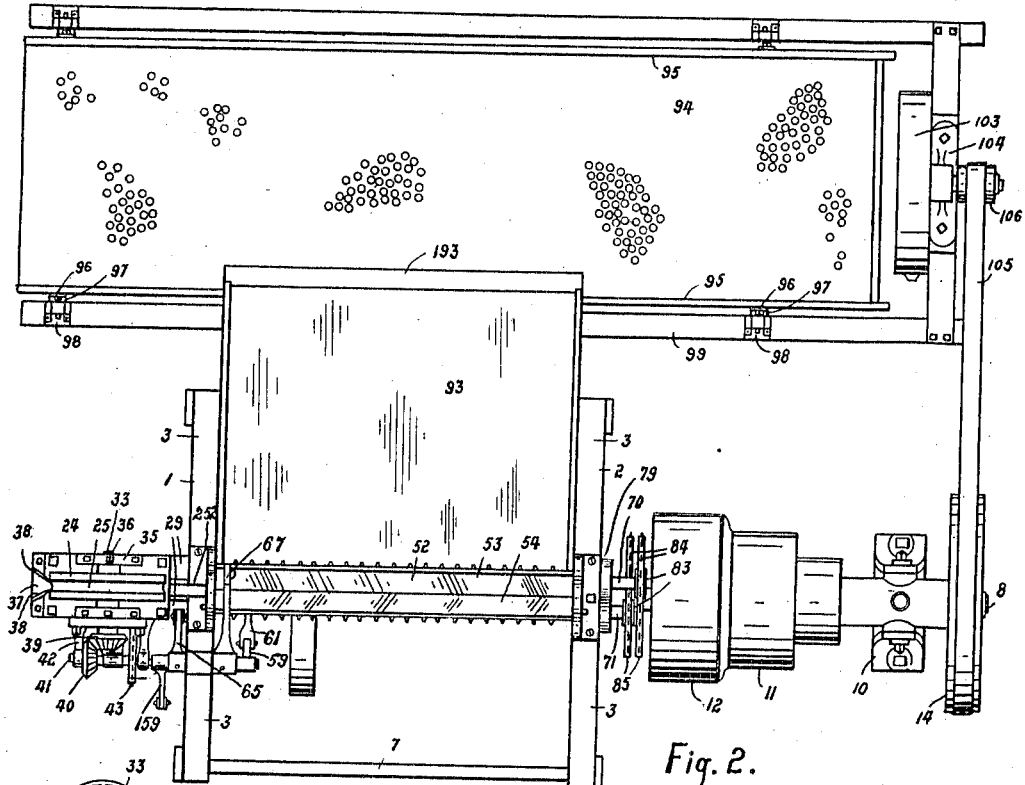
Figures 3, 5:
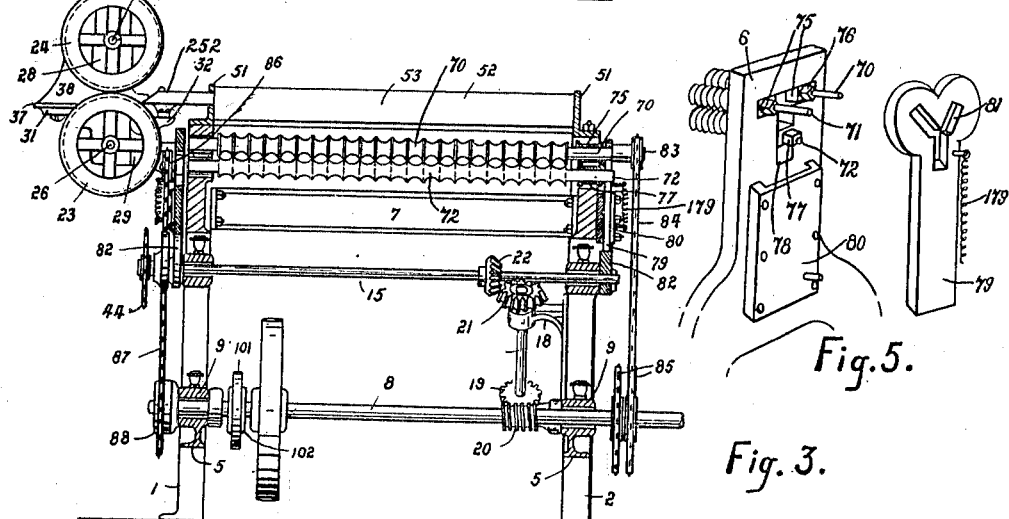

In the drawings, Figure 1 is a perspective view of the machine, showing the cutting spindles in their open position, and the trough in readiness to open and deposit the stick of candy between the spindles. Fig. 2 is a plan view of the machine. Fig. 3 is a longitudinal sectional view of the machine. Fig. 4 is an elevation of the machine from the feeding end thereof. Fig. 5 is a perspective detail view of the end plates and head-pieces of the standards, showing the spindle journal blocks arranged therein. Fig. 6 is a sectional perspective detail of the shaft and sleeve with arms attached thereto for operating the knife and trough. Fig. 7 is a cross sectional view of the drying screens. Fig. 8 is an enlarged detail side elevation of a section of the forming and cutting rolls. Fig. 9 is an enlarged side elevation of a section of a modified form of the forming and cutting rolls. Fig. 10 is a front elevation of a modified arrangement of the end plates in which the spindle journal blocks are supported and cams for operating the same. Fig. 11 is a vertical sectional view of a modified arrangement of the end plates in which the spindle journal blocks are supported and cams for operating the same.

Like numerals of reference indicate corresponding parts in each figure.

Referring to the drawings, 1 and 2 are the end standards of the machine, which may be of any suitable shape, though here shown as having the outwardly-curved legs 3, cross-bars 4 and 5 and the vertically-arranged head-pieces 6.

7 are tie-bars extending between the end standards 1 and 2 and holding the same in a rigid upright position.

8 is the main driving-shaft journaled in the bearings 9 midway of the length of the cross-bars 5, said shaft extending some distance out from one end of the machine, and being further supported by the hanger-bracket 10.

11 and 12 are loose and driving pulleys respectively, mounted on the shaft 8 between the standard 2 and the bracket 10, and 14 is a fly-wheel mounted on the shaft 8 where it projects beyond the hanger-bracket 10.

15 is a counter-shaft journaled longitudinally of the frame of the machine in the bearings 16 arranged midway of the length of the cross-bars 4.

17 is a connecting-shaft journaled in the journal brackets 18 projecting laterally from the inside of the standard 2.

19 is a worm gear fixedly mounted on the connecting-shaft 17 toward the lower end thereof, and meshing with the worm 20 mounted on the main driving-shaft 8.

21 is a miter-gear fixedly mounted on the connecting-shaft 17 toward the upper end thereof, and meshing with the miter gear 22 mounted on the counter-shaft 15. It will be thus seen that the driving-shaft through the medium of the connecting-shaft 17 imparts a rotary movement to the counter-shaft 15 through the worm and gear and miter-gear connections, said worm and gear reducing the speed of the connecting-shaft and counter-shafts considerably below that of the main driving-shaft.

The several parts of the machine as hereinafter described are operatively connected to either the driving-shaft or the counter-shaft according to the speed to which it is desired to operate the parts, the forming elements being operated at a high speed from the main shaft, and the feeding elements of the machine being operated at a reduced speed from the counter-shaft, as hereinafter fully explained.

23 and 24 are the feed rolls having the channels 25 formed in the periphery thereof. The feed roll 23 is fixedly mounted on the shaft 26 extending through journal orifices toward the lower end of the uprights 28 securely bolted to the extension brackets 29, said brackets 29 in turn being securely bolted to the head-piece of the standard 1 of the machine and projecting outwardly therefrom. The uprights 28 have the vertical slots 30, and the arms 31 and 32 projecting therefrom intermediate of the height thereof. The feed roll 24 is mounted on the shaft 33 extending through the bearing-blocks 34 fitting the vertical slots 30 in the uprights 28.

35 are top plates secured across the upper ends of the uprights 28 over the vertical slots 30, and 36 are set-screws inserted through correspondingly-threaded orifices in the top plates 35, and contacting with the bearing-blocks 34 in the vertical slots 30, so that the said screws may be screwed downwardly to hold the periphery of the feed roll 24 in contact with the periphery of the feed-roll 23 therebeneath, whereby the top feed roll is rotated by the friction of the two peripheral meeting faces of the feed rolls 23 and 24.

37 is a bridge secured to the arms 31 and extending between the pair of uprights 28 immediately in front of the meeting faces of the feed rolls, said bridge having the guide plates 38 conforming to the periphery of the feed roll 24 and gradually converging to the edges of the channels in said feed roll, whereby when the candy is fed onto the bridge-piece it will be directed between the guides into the channels in the periphery of the feed rolls. The shaft 26 at one end thereof has the miter-gear 39 fixedly secured thereon and intermeshing with the miter-gear 40 fixedly mounted on the shaft 41 journaled in the brackets 42, said brackets being secured to one of the extension brackets 29.

43 is a sprocket-wheel fixedly mounted on the shaft 41 next to the miter-gear 40, said sprocket being rotatably connected by the chain 143 with the sprocket-wheel 44 fixedly mounted on the shaft 15, where it extends on the outside of the standard 1.

45 is a stud shaft extending outwardly from the standard 1 approximately the same height as the counter-shaft 15.

47 is an elbowed-arm having a sleeve formed at one end thereof and journaled on the stud shaft 45.

48 are flanged rollers journaled on suitable pins projecting from the arm 47 at the elbow thereof, and from the outer end, said rollers bearing against the chain 143, so that one length of said chain is slack.

49 is a cam lever fixedly secured on the sleeve of the elbowed-arm 47.

50 is a cam fixedly mounted on the counter-shaft 15, where it extends outside of the standard 1, and engaging with the cam lever 49, whereby the elbowed-arm 47 is oscillated to change the slack of the chain 143 from one side to the other, and in so doing momentarily stop the rotation of the sprocket-wheel 43, which through the miter-gear connection with the shaft of the feed roll 23 will check the rotation of the feed rolls 23 and 24 during the operation of cutting the stick of candy, as hereinafter described, said cam lever being retained in contact with the cam 50 by the coil spring 149 encircling the stud shaft 45, and having one extremity caught into said cam lever, and the other extremity fastened to the standard.

51 are brackets bolted on the top of the head-pieces 6, the bracket 51 at the feed end of the machine having an orifice therethrough, through which the stick of candy from the feed rolls passes. The candy in passage from said feed rolls through said orifice is preferably guided by a tubular guide 252 supported from the arms 32 of the uprights 28, said guide being in alinement with the meeting channel faces of the two feed rolls 23 and 24.

52 is a trough having the side 53 fixedly secured between the brackets 51 and the side 54 pivotally secured between said brackets by the pins 55 at the top corners thereof.

56 is a plate secured to the pivoted side 54 of the trough adjacent to the feed end of the machine, and having the lugs 57 projecting therefrom, said lugs having suitable orifices in which is inserted a spring-held pin 58.

59 is a lever fixedly mounted on the inner end of the shaft 60 extending through a journal orifice in the head-piece of the standard 1 adjacent to the top thereof, said lever being connected by the rod 61 with the spring-held pin 58.

159 is a lever fixedly mounted on the shaft 60 at the outer end thereof.

62 is a rod connecting the lever 159 with the cam lever 63, said cam lever being pivotally mounted on the stud shaft 64 projecting outwardly from the standard 1 adjacent to the stud shaft 45. The cam lever 63 is under the cam lever 49, and the cam 50 immediately after operating the cam lever 49 operates the cam lever 63, and through the connection thereof with the levers 59 and 159 swings the pivoted side 54 of the trough outwardly and allows the stick of candy to drop therefrom.

65 is an arm fixedly mounted on the outer end of the sleeve 164, said sleeve encircling the shaft 60 between the levers 59 and 159, and turning in the journal orifice through which said shaft 60 passes. The arm 65 at the outer end thereof is pivotally connected by the rod 66 with the cam lever 166, said lever being pivotally mounted on the stud 167 projecting outwardly from the standard 1 between the studs 45 and 64.

67 is a knife-arm fixedly mounted on the inner end of the sleeve 164.

68 is a knife blade secured to the inner end of the knife-arm 67 immediately above the orifice through the bracket 51 at the feed end of the machine. By this arrangement the knife operates with the opening of the trough, and cuts the stick of candy at the feed end of the machine, so that it may drop from the trough when opened, and it will thus be noticed that the trough and knife are operated by the cam 50 immediately after the cam has moved the elbowed-arm 47 to check the feed rollers 23 and 24, as hereinafter described, so that the feeding of the candy into the trough is stopped for the moment, while it is being cut and the trough opened.

69 is a spring bolt arranged at the inner end of the knife-arm in the vertical orifice 170 in the boss 171, and projecting slightly below the cutting edge of the knife, so that the stick of candy after the knife has cut through will not adhere to the knife, but will be forced clear by the spring-bolt 69 into the trough.

70, 71 and 72 are forming spindles having a series of circumferential grooves formed throughout their length, said grooves, as illustrated in Figs. 3 and 8, being semi-circular, so that the grooves of a pair of spindles in meeting will form a complete circle or, as illustrated in Fig. 9, these grooves may be made of varying depth to form the candy into substantially conical form, or any form that may be desired having a circular periphery. The spindles 71 and 72 between each groove have a circumferential slot 73, and the spindle 70 between each groove has the sharp serrated ridge 74, which enters the slots 73 when the spindles are closed together, as hereinafter explained, so that the candy in each groove is cut into individual pieces. The spindles 70 and 71 at the ends thereof are journaled in the blocks 75 slidably arranged in the cross slot 76 adjacent to the top of the head-piece 6 of the standards 1 and 2. The spindle 72 is journaled at the ends thereof in blocks 77 slidably arranged in the vertical slots 78 meeting the cross slot 76 midway.

79 are end plates having a vertical movement in the guide-boxes 80. The end plates 79 at the top thereof have the Y-shaped slots 81.

The blocks in which the ends of the spindles 70 and 71 are journaled extend through the arms of the Y-slot 81, while the blocks in which the ends of the spindle 72 are journaled project through the stem of the Y-slot 81.

82 are cams fixedly mounted on the counter-shaft 15, immediately outside the standards 1 and 2, said cams engaging the lower end of the end plates 79, and raising the said plates in the guide-boxes 80, so that the ends of said spindles are drawn toward one another owing to the converging of the Y-shaped slots in the end plates, as they are raised.

179 are spiral springs connecting the end plates 29, and the guide-boxes 80, whereby said end plates are continually spring-held against the cams 82. The spindle 72 is raised, when the blocks in which the ends of said spindle are journaled contact with the bottom of the Y-shaped slots as the end plates are being raised. The spindles 70 and 71 at one end thereof have the small sprockets 83 fixedly mounted thereon, said sprockets being connected by the chains 84 with the sprockets 85 fixedly mounted on the main driving-shaft 8 between the standard 2 and the driving-pulley 12, whereby the spindles 70 and 71 are continuously rotated. The spindle 72 at the feed end of the machine has the small sprocket 86 fixedly mounted thereon, and operatively connected by the chain 87 with the sprocket 88 fixedly mounted on the driving-shaft 8.

89 is a spring-held arm pivotally connected at one end with a stud 90 projecting outwardly from the standard 1, said arm at the free end thereof carrying the flanged idler roll 91, bearing against the chain 87 to take up the slack required in said chain to admit of the raising of the spindle 72 by the end plates, as hereinbefore described.

189 is an arm similar to the arm 89, and having the flanged idler roll 190 at the end thereof bearing against the chain 87 opposite the roll 91, whereby said chain is held clear of the sprockets on the end of the counter-shaft.

As shown in Fig. 1, when the trough is about to open to drop the stick of candy between the forming spindles, the said spindles are spread apart as the end plates are contacting with the low section of the cams 82, and as the machine continues to work the spindles being rotated at high speed through the chain and sprocket connection thereof with the main driving-shaft, the stick of candy will be worked gradually into the grooves in said spindles as they are drawn together through the gradual raising of the end plates until finally the spindles approach one another close enough to divide the candy into several individual pieces, after which a quick drop in the cams 82 causes the spindles to move quickly to their open position, and the pieces of candy are ejected between the rolls 70 and 72, an inclined tray 93 being secured between the standards on that side of the machine to guide the candy onto the drying-screens 94, said tray having a stepped ledge 193 at the delivery end thereof to catch any small pieces of candy or chips so that they may be gathered from the ledge, and again mixed with candy going through the machine. The drying-screens 94 are herein shown as three in number and comprising a length of metal having small holes punched therethrough to form a screen surface over which the candy will easily pass. The screens have the frame 95 extending around both sides and one end thereof, so that one end of the screen is left open. The screens are set on an incline, so that the candy will work toward the open end of the screen and fall onto the second screen therebelow at the closed end thereof, and the second screen being inclined at the opposite end to the first screen, the candy will work to the open end of the second screen and fall onto the closed end of the third screen, and along the third screen to a receiving box.

The screens 94 are secured one above the other in the arrangement above-mentioned by the side bars 96, said bars being suspended at the lower ends thereof by the spring bars 97 extending from the top of the posts 98, which may be securely bolted to the floor, or, if desired, to a frame 99. In order to have the candy pass over the screens they are reciprocated through the action of the connecting rod 100 connected at one end thereof to the bottom screen, and at the other end thereof to the eccentric strap 101 encircling the eccentric 102 fixedly mounted on the main driving-shaft 8. It will also be found an advantage to have a fan or blower 103 suitably mounted on a bracket 104 at one end of the screens to send a current of air along the screens to dry the candy. The fan may be conveniently operated by the belt 105 encircling the pulley 106 secured to the shaft of the fan and the fly-wheel 14 secured to the main driving-shaft where it projects beyond the hanger bracket 10.

Referring to Figs. 10 and 11, a modified arrangement of the end plates is shown, whereby an additional end plate 194 is arranged between the regular plate 79 hereinbefore described and the head-piece 6 of the standards 1 and 2. The end plate 194 supports the block 77 of the spindle 72 independently of the plate 79, whereby said spindle is held to its normal position as hereinbefore described.

195 is a spring contained within a vertical slot intermediate of the height of the plate 194, and bearing on the lower end thereof against the lower end of said slot, and at the upper end thereof against the pin 196 projecting outwardly from the standard 2 of the machine into the slot in said plate 194. The plate 194 bears on the cam 197 mounted on the shaft 15 immediately next the cam 82. The cam 197 is so timed that it will drop the plate 194 before the cam 82 will drop the plate 79. It will thus be seen that the spindle 72 will be lowered before the spindles 70 and 71 start to separate. This manner of discharging the candy after it has been formed and cut into the desired shapes is sometimes found necessary, particularly where the candy has a tendency to adhere to the rolls.

What we claim as our invention is:

1. A candy forming and cutting machine, comprising a supporting frame, a plurality of forming and cutting spindles having a plurality of peripheral grooves throughout their length and rotatably mounted in said frame, a trough having one side thereof fixedly supported from said frame above said spindles and the other side thereof pivotally supported in said frame above said spindles, a driving-shaft, means operatively connecting said shaft with said spindles, means operatively connected with said shaft for intermittently swinging the pivoted side of said trough, a knife-arm pivotally supported at one end thereof from said frame and having a cutting blade in proximity to one end of said trough and means operatively connected to said shaft for intermittently tripping said knife-arm.

2. A candy forming and cutting machine, comprising a supporting frame, a plurality of forming and cutting spindles having a plurality of peripheral grooves throughout their length and rotatably mounted in said frame, a trough having one side thereof fixedly supported from said frame above said spindles and the other side thereof pivotally supported in said frame above said spindles, a driving-shaft, a counter-shaft operatively connected to said driving-shaft, means operatively connecting said driving-shaft with said spindles, means operatively connected with said counter-shaft for intermittently swinging the pivoted side of said trough, a knife-arm pivotally supported at one end thereof from said frame and having a cutting blade in proximity to one end of said trough and means operatively connected to said counter-shaft for intermittently tripping said knife-arm.

3. A candy forming and cutting machine, comprising a pair of standards each formed with a head-piece having a horizontal slot and a vertical slot meeting said horizontal slot midway of the length thereof, a pair of end plates slidably arranged on said head-pieces and each having a vertical slot and a pair of angularly-arranged slots diverging from the upper end of said vertical slot, bearing blocks arranged in the slots in said head-pieces and extending into the slots in said end plates, spindles journaled in said bearing blocks and having grooved collars fixedly mounted thereon and spaced apart, disks having sharpened serrated edges and secured on one of said spindles between said collars, sprockets secured on the extremities of said spindles where they project through said bearing blocks, a driving-shaft journaled in suitable bearings supported by said standards, sprockets fixedly mounted on said driving-shaft, chains operatively connecting the sprockets on said spindles with the sprockets on said driving-shaft, a spring-held arm pivotally secured at one end thereof to one of said standards, a roller journaled at the outer end of said arm and bearing against the chain operating the spindle in the vertical slots in said standard, cams fixedly mounted on said shaft and contacting with the bottom of said end plates whereby said end plates are reciprocated to move said spindles toward and away from one another.

4. A candy forming and cutting machine, comprising a supporting frame, a plurality of forming and cutting spindles having a plurality of peripheral grooves throughout their length and rotatably mounted in said frame, a trough having one side thereof fixedly supported from said frame above said spindles and the other side thereof pivotally supported in said frame above said spindles, a driving-shaft, means operatively connecting said shaft with said spindles, means operatively connected with said shaft for intermittently swinging the pivoted side of said trough, a pair of channeled feed rolls journaled in suitable bearings from said supporting frame and adapted to feed material into said trough, means operatively connected with said shaft for intermittently operating said feed rolls, an inclined tray supported by said frame beneath said spindles and having a stepped ledge at the delivery end thereof, a plurality of inclined drying-screens and means operatively connected with said driving-shaft for vibrating said screens.

5. A candy forming and cutting machine, comprising a supporting frame, a plurality of grooved forming and cutting spindles having a plurality of peripheral grooves throughout their length and rotatably mounted in said frame, a trough having one side thereof fixedly supported from said frame above said spindles and the other side thereof pivotally supported in said frame above said spindles, a driving-shaft, means operatively connecting said shaft with said spindles, means operatively connected with said shaft for intermittently swinging the pivoted side of said trough, a pair of channeled feed rolls journaled in suitable bearings from said supporting frame and adapted to feed material into said trough, means operatively connected with said shaft for intermittently operating said feed rolls, an inclined tray supported by said frame beneath said spindles and having a stepped ledge at the delivery end thereof, a plurality of inclined drying-screens, means operatively connected with said driving-shaft for vibrating said screens, a bearing-bracket positioned at one end of said drying-screens, a fan journaled in said bearing bracket and means operatively connecting said fan with said driving-shaft.

6. A candy forming and cutting machine, comprising a supporting frame, a main driving-shaft journaled in said supporting frame, a counter-shaft journaled in said supporting frame and operatively connected with said main driving-shaft, a plurality of forming and cutting spindles journaled in said supporting frame and operatively connected with said main driving-shaft, a trough supported by said frame immediately above said spindles, a knife-arm pivotally supported from said frame, a pair of feed rolls rotatably supported from said frame and operatively connected to said counter-shaft, a cam fixedly mounted on said second shaft and means operatively connected with said cam for intermittently arresting the rotation of said feed rolls and intermittently tripping said knife-arm and intermittently emptying said trough.

7. In a candy forming and cutting machine, the combination with a supporting frame having a plurality of forming and cutting spindles rotatably mounted therein and a pair of intermittently-operated feed rolls and a trough supported by said frame above said spindles and into which the candy in stick form is fed by said rolls, of a knife arm pivotally supported at one end thereof from said frame, a knife-blade secured to said arm, a spring-held bolt slidably arranged on said arm immediately beneath said blade and means for tripping said knife-arm to bring the blade thereof and said bolt into contact with the stick of candy fed into said trough.

Signed at the town of Joliette, in the Province of Quebec, in the Dominion of Canada, this third day of January, 1910.

SAMUEL VESSOT.
EDOUARD NADEAU.
ALPHONSE PAQUIN.

Witnesses:
G. M. BAUDOIN,
C. G. H. BEAUDOIN.

Copies of this patent may be obtained for five cents each, by addressing the "Commissioner of Patents, Washington, D. C."